United States Patent
Kim et al.

(10) Patent No.: US 9,906,818 B2
(45) Date of Patent: Feb. 27, 2018

(54) METHOD OF PROVIDING BROADCASTING SERVICE AND PLAYING BROADCAST BY USING OBJECT STATE TRANSMITTING METHOD

(71) Applicant: MINKONET CORPORATION, Seoul (KR)

(72) Inventors: Tae Woo Kim, Gyeonggi-do (KR); Dong Hwal Lee, Seoul (KR); Won Gil Ryim, Gyeonggi-do (KR)

(73) Assignee: MINKONET CORPORATION, Seoul (KR)

( * ) Notice: Subject to any disclaimer, the term of this patent is extended or adjusted under 35 U.S.C. 154(b) by 0 days.

(21) Appl. No.: 15/210,876

(22) Filed: Jul. 14, 2016

(65) Prior Publication Data

US 2017/0019693 A1    Jan. 19, 2017

(30) Foreign Application Priority Data

Jul. 15, 2015 (KR) .................. 10-2015-0100175

(51) Int. Cl.
*H04N 7/173* (2011.01)
*H04N 21/234* (2011.01)
*H04N 21/2187* (2011.01)
*H04N 21/84* (2011.01)

(52) U.S. Cl.
CPC ... *H04N 21/23418* (2013.01); *H04N 21/2187* (2013.01); *H04N 21/84* (2013.01)

(58) Field of Classification Search
CPC ......... H04N 21/23418; H04N 21/2187; H04N 21/84
USPC ....................................................... 725/116
See application file for complete search history.

(56) References Cited

U.S. PATENT DOCUMENTS

| | | | |
|---|---|---|---|
| 7,047,306 B2 | 5/2006 | Zee et al. | |
| 7,095,450 B1* | 8/2006 | Holmes | A63F 13/12 345/629 |
| 7,199,836 B1* | 4/2007 | Eleftheriadis | H04N 21/23412 345/630 |
| 2007/0146360 A1* | 6/2007 | Clatworthy | G06T 15/20 345/419 |
| 2007/0216675 A1* | 9/2007 | Sun | G06T 11/00 345/419 |
| 2015/0187108 A1* | 7/2015 | Mullins | G06T 19/006 345/633 |
| 2016/0059129 A1* | 3/2016 | Ho | A63F 13/00 463/32 |

* cited by examiner

*Primary Examiner* — Nathan Flynn
*Assistant Examiner* — Alfonso Castro
(74) *Attorney, Agent, or Firm* — JCIPRNET

(57) ABSTRACT

Provided is a method of providing a broadcasting service and playing a broadcast by using an object state transmitting method, in which a data capacity of a video may be remarkably reduced to transmit a broadcasting image and image data of the broadcasting image may be received and played. Accordingly, according to the method of providing a broadcasting service and playing a broadcast by using an object state transmitting method, a broadcasting image having a small data capacity may be transmitted, received and provided at a high image quality at the same time.

8 Claims, 2 Drawing Sheets

METHOD OF PROVIDING BROADCASTING SERVICE AND PLAYING BROADCAST BY USING OBJECT STATE TRANSMITTING METHOD

RELATED APPLICATION

This application claims the benefit of Korean Patent Application No. 10-2015-0100175, filed on Jul. 15, 2015, in the Korean Intellectual Property Office, the disclosure of which is incorporated herein in its entirety by reference.

BACKGROUND

1. Field of the Invention

The present disclosure relates to a method of providing a broadcasting service and playing a broadcast, by using an object state transmitting method, and more particularly, to a method of providing a broadcasting service and playing a broadcast, by using an object state transmitting method, in which a broadcasting image may be transmitted by remarkably reduced data capacity of a video, and broadcasting data may be received to play a broadcast.

2. Description of the Related Art

As devices such as smartphones and tablets have recently been widely supplied, a broadcast is transmitted using various methods. A broadcast is provided not only by receiving a broadcasting signal through antennas and playing on a terminal as in the conventional art, but a method of transmitting a broadcast through the Internet is also frequently used.

In particular, operators of broadcasting servers who provide a broadcasting service through the Internet via wired or wireless networks face several kinds of difficulties when providing a broadcasting service by transmitting a broadcasting image having a relatively large data capacity by using a streaming method. If there are a very large number of broadcasting terminals, it is difficult to transmit large-capacity data to each terminal through the Internet. Accordingly, if too many receivers suddenly access a broadcasting server, the broadcasting server may be down or broadcasting transmission may not be properly carried out.

SUMMARY

Provided is a method of providing a broadcasting service and playing a broadcast by using an object state transmitting method in which a data transmission capacity of a broadcasting image may be remarkably reduced and the broadcasting image may be played at a high image quality.

Additional aspects will be set forth in part in the description which follows and, in part, will be apparent from the description, or may be learned by practice of the presented embodiments.

According to an aspect of the present invention, there is provided a method of providing a broadcasting service by using an object state transmitting method, wherein a broadcasting server transmits image information to a play terminal so that the play terminal receives the image information in real-time and plays the image information, the method including: (a1) when things, characters, and backgrounds appearing in three-dimensionally defined virtual space, defined as objects, appear in virtual space of a broadcasting image, generating identification numbers of the objects, numerical data of position coordinates and directions of the objects in the virtual space, and serial numbers of image frames, in which the objects appeared, as appearance information and transmitting the appearance information to the play terminal so that the play terminal creates the objects disposed in the virtual space in units of image frames to render the image frames on a screen, wherein the generating and transmitting of the appearance information is performed by the broadcasting server; (a2) when an object that appeared in step (a1) moves in the virtual space of the broadcasting image, creating numerical data defining a motion of the object corresponding to a serial number of the image frame as motion state information and transmitting the motion state information to the play terminal so that the play terminal creates the motion of the object in units of image frames and renders the image frames on the screen, wherein the creating and transmitting of the motion state information is performed by the broadcasting server; and (a3) when an object that appeared in step (a1) exits from the virtual space, transmitting the identification number of the exiting object and a serial number of an image frame in which the object exits, to the play terminal as exit information so that the play terminal removes the exiting object from the virtual space and creates an image frame to render the image frame on the screen, wherein the transmitting of the exit information is performed by the broadcasting server.

According to another aspect of the present invention, there is provided a method of playing a broadcast by using an object state transmitting method, wherein a broadcasting server transmits image information to a play terminal so that the play terminal receives the image information in real-time and plays the image information by displaying the image information on a screen, the method including: (b1) when things, characters, and backgrounds appearing in three-dimensionally defined virtual space, defined as objects, appear in virtual space of a broadcasting image, receiving, from the broadcasting server, identification numbers of the objects, numerical data of position coordinates and directions of the objects in the virtual space, and serial numbers of image frames, in which the objects appeared, as appearance information, wherein the receiving of the appearance information is performed by the play terminal; (b2) when an object that appeared in step (b1) moves in the virtual space of the broadcasting image, receiving, from the broadcasting server, numerical data defining a motion of the object corresponding to a serial number of the image frame, as motion state information, wherein the receiving is performed by the play terminal; (b3) when an object that appeared in step (b1) exits from the virtual space, receiving, from the broadcasting server, the identification number of the exiting object and a serial number of an image frame in which the object exits, as exit information, wherein the receiving is performed by the play terminal; and (b4) linking the appearance information, the motion state information, and the exit information respectively received in (b1), (b2), and (b3) with three-dimensional shape information corresponding to respective serial numbers of the objects stored in advance in the play terminal so as to create image frames in real-time and continuously display the image frames on the screen.

According to the method of providing a broadcasting service and playing a broadcast by using an object state transmitting method of the present invention, a broadcasting image having a small data capacity may be transmitted or received, and may be provided at a high image quality at the same time.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a method of providing a broadcasting service and playing a broadcast by using an object state transmitting method according to the present invention will be described more fully with reference to exemplary embodiments of the present invention.

The method of providing a broadcasting service and playing a broadcast by using an object state transmitting method, according to the present embodiment is used in a method of transmitting a video created based on three-dimensional objects in three-dimensional space, by using a broadcasting method, and receiving and displaying the video on a screen of a play terminal.

One of examples of video contents created by using three-dimensional objects as described above is a game video. As game development tools for three-dimensional games, programs such as Unity3D are widely used. Such game development tools as these enable game developers to easily create objects used in games (such as characters, props, backgrounds, or weapons) and dispose the objects in virtual space of a game such that they are moved or activated. Such game development tools are designed to display a game image on a screen in units of frames. For example, Unity3D constructs a game image by creating images at 50 frames per second and sequentially displaying the images on a screen. When a position shift or a motion of three-dimensional objects in virtual space is defined by a game developer, the game development tool constructs the shape of a game by automatically calculating a real-time shape of an object according to a game player's manipulation and rendering an image at 50 frames per second on a screen. The frame per second (FPS) of a game shape may vary according to game development tools. A motion of objects appearing in a game also consists of frames. For example, a motion of a gun shooting bullets in a game is stored as three-dimensional mesh data consisting of 100 frames. When an operation of firing a gun in a real game is performed, the gun is sequentially deformed according to the 100 frames at a preset position in virtual space, and a game engine renders in real-time images mapped to respective frames of all objects in the virtual space to display the image on the screen. Although operations have the same number of frames, videos may be realized at varying speeds according to a mapping method between a frame serial number of the operations and a serial number of an absolute frame of the entire virtual space time of a game.

The present invention provides a method of effectively broadcasting a video by using the latest video content development environment, compared to a conventional streaming method.

Figure 1:
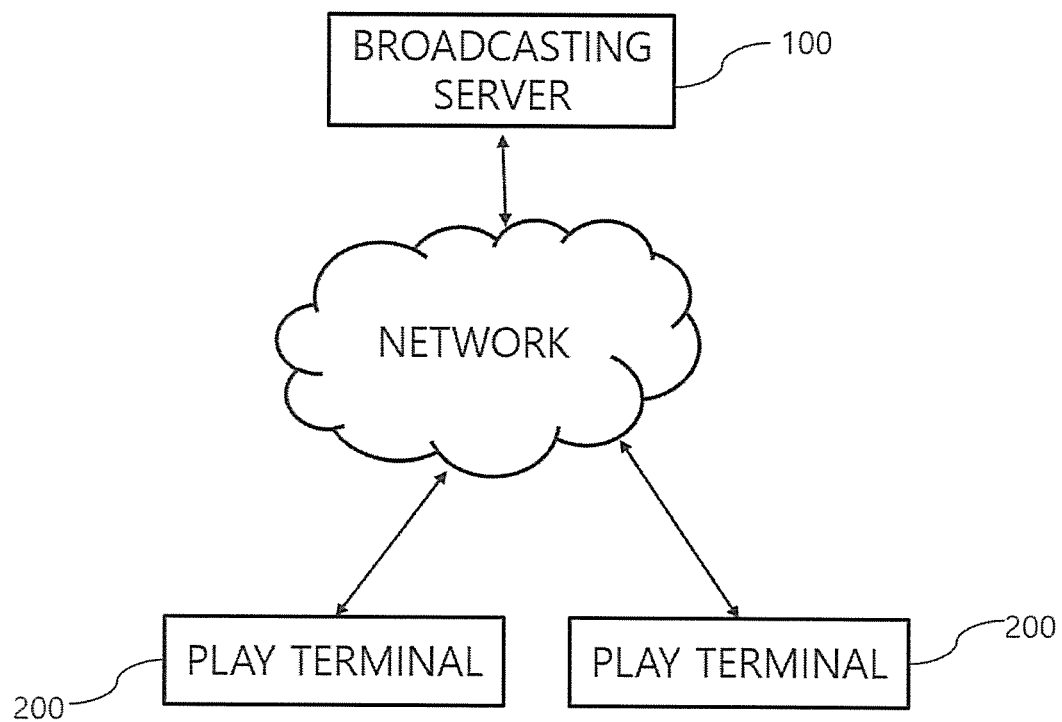
FIG. 1 is a schematic view of a system for describing a method of providing a broadcasting service and playing a broadcast by using an object state transmitting method, according to an embodiment of the present invention.
Figure 2:
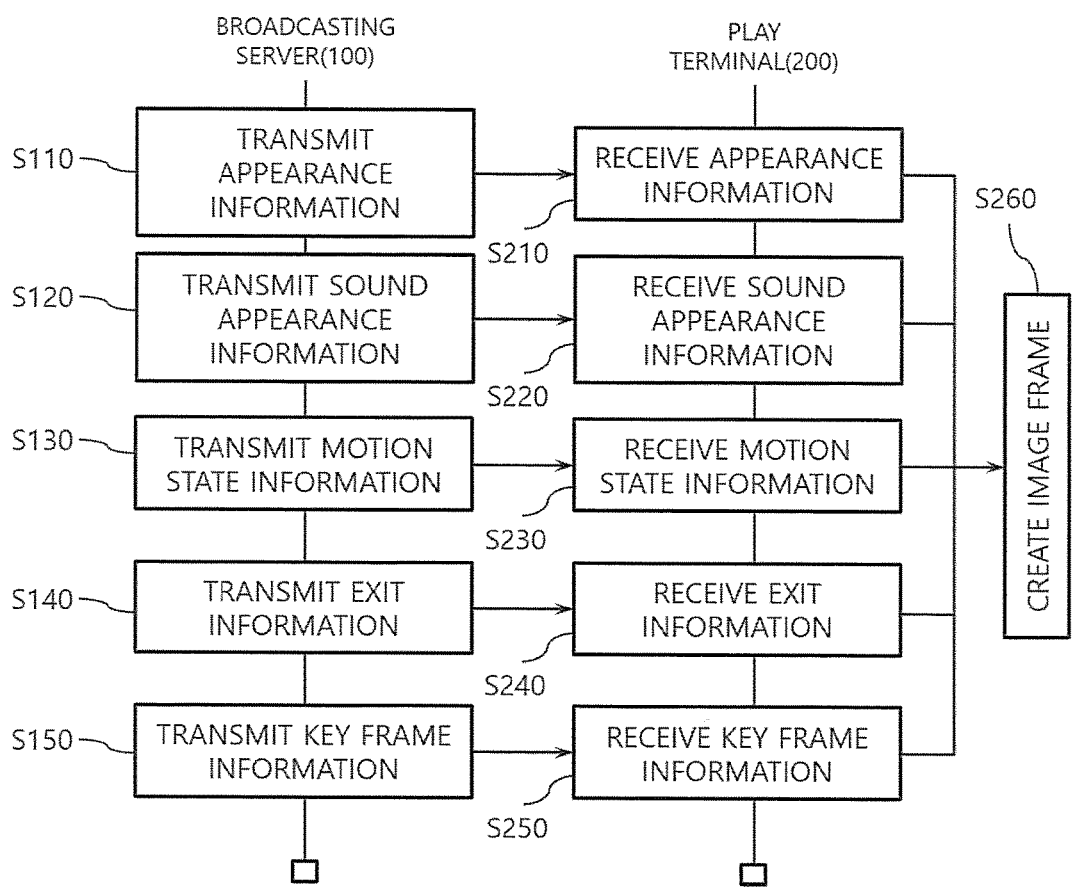
FIG. 2 is a flowchart of a method of providing a broadcasting service and playing a broadcast by using an object state transmitting method, according to an embodiment of the present invention.

FIG. 1 is a schematic view of a system for describing a method of providing a broadcasting service and playing a broadcast by using an object state transmitting method, according to an embodiment of the present invention. FIG. 2 is a flowchart of a method of providing a broadcasting service and playing a broadcast by using an object state transmitting method, according to an embodiment of the present invention.

According to the method of providing a broadcasting service and playing a broadcast by using an object state transmitting method of the present invention, in a similar manner to a game competition broadcast, a broadcasting server 100 transmits a game situation to each play terminal 200 by using game data based on three-dimensional objects and created in real-time, and the play terminal 200 displays the game situation on a screen by using data regarding motion of the three-dimensional objects.

A broadcast of a game play as described above will be assumed herein, and a method in which the broadcasting server 100 transmits a game play situation and the play terminal 200 displays the game play situation on a screen will be described in detail below. The method of providing a broadcasting service by using an object state transmitting method according to the present invention is performed using the broadcasting server 100, and the method of playing a broadcast by using an object state transmitting method, according to the present invention, is performed using the play terminal 200.

First, a game engine monitors objects existing in virtual space of a game while a user is playing the game. The objects may be classified, for example, as objects existing in virtual space from the start of the game, objects appearing in or disappearing from the virtual space depending on a game play situation, objects fixed at particular positions of the virtual space without moving after they are disposed, and objects moving or changing their shape according to game situations. According to the method of providing a broadcasting service by using an object state transmitting method of the present invention, an appearance or an exit of and a stationary state or a moving state of objects in virtual space are kept track of and used in broadcasting as described below.

While the user is playing the game, if a new object appears in the virtual space, an identification number of the object, numerical data of position coordinates and a direction of the object in the virtual space, and a serial number of an image frame in which the object appeared are created as appearance information and transmitted to the play terminal 200 (step (a1), S110). When the broadcasting server 100 monitors a game play situation played by a game player and detects a new object in the virtual space, an identification number of the object and a serial number of an image frame at a point of time when the object appeared is transmitted as appearance information to the play terminal 200. In addition, numerical data of position coordinates and a direction of the object indicating at which position and in which direction the object is disposed in the virtual space is also transmitted as the appearance information to the play terminal 200.

Objects used in the game are already stored in a library used by the game engine, and thus, just with identification numbers of the objects, the objects may be searched for in the library and used by the play terminal 200 to configure a broadcasting image. Meanwhile, as the game is displayed on the screen in units of frames rendered at predetermined time intervals as described above according to the present invention, transmitting of a serial number of an image frame in which the object appeared is the same as transmitting of time the object appeared in the virtual space. Information defined by an identification number of an object that appeared as described above, coordinates and a direction of the object, and a serial number of an image frame in which the object appeared will be referred to as appearance information. If other information needed to dispose the object in virtual space for the first time is present, this information may also be stored as the appearance information.

When a game broadcast starts during game play, identification numbers, position coordinates, and directions of all objects existing already in the virtual space of the game are transmitted by the broadcasting server 100 to the play terminal 200 as appearance information in accordance with a serial number of a first image frame.

As described above, the appearance information transmitted from the broadcasting server 100 is received by and stored in the play terminal 200 (step b1); S210). The appearance information stored in the play terminal 200 as described above is used by the play terminal 200 to display a broadcasting image on a screen.

Among the objects appearing in the virtual space as described above, objects such as backgrounds or props do not move but are fixed. The fixed objects need only be displayed until they disappear after they are disposed in the virtual space, and thus, data regarding the fixed objects does not have to be additionally created to create an image frame later and transmitted from the broadcasting server 100 to the play terminal 200.

However, regarding moving objects, changes in states of the objects have to be transmitted from the broadcasting server 100 to the play terminal 200 in order to create image frames with time so that the play terminal 200 may display a broadcasting image on a screen.

According to the present embodiment, when an object appeared in step (a1) is moving in the virtual space, numerical data defining motion of the object corresponding to an image frame serial number is stored by the broadcasting server 100 as motion state information and transmitted to the play terminal 200 (step (a2), S130). The play terminal 200 receives and stores the motion state information (step (b2); S230).

That is, information about motions of objects with time is transmitted by the broadcasting server 100 to the play terminal 200. A motion of an object may be transmitted using two methods. If the object moves without changing its shape, position coordinates and a direction of the object corresponding to a serial number of each image frame are stored and transmitted by the broadcasting server 100 to the play terminal 200. That is, positions and directions of the objects with time are transmitted. If the object moves while its shape changes (for example, if a character walks or a tool is operated), in addition to a position and a direction of the object corresponding to each image frame serial number, an identification number of a motion of the object stored in the library of the game engine (that is, an identification number indicating a motion type) and a serial number of a frame defining the motion are stored in the broadcasting server 100 in accordance with the image frame serial number and transmitted to the play terminal 200. If an object moves with a shape change, the motion is already stored in the library of the play terminal 200, and how the motion is performed (how the three-dimensional shape of the object changes) is stored in the play terminal 200 in units of frames. Thus, if frame serial numbers of an object motion respectively corresponding to serial numbers of image frames based on which a video is created are known, a change in the shape of the object with time may be realized. According to circumstances, a serial number of an image frame and a frame serial number of an object motion may be mapped to each other in a one-to-one correspondence. In this case, time of an object motion and time of a game video may flow at the same rate. If the mapping is performed such that a serial number of an object motion increases according to an arithmetic progression with a common difference of three with respect to an image frame serial number, the motion of the object in a broadcasting image is three times faster than the previously described case. Information transmitted by the broadcasting server 100 to the play terminal 200 in step (a2) and received and stored by the play terminal 200 in step (b2) as described above is referred to as motion state information.

According to the above-described method, objects appearing in virtual space and changes in moving objects among the objects with time may be transmitted from the broadcasting server 100 to the play terminal 200 to construct a broadcasting image by using a relatively small data capacity.

Next, when an object appeared in step (a1) exits from the virtual space, the serial number of the exiting object and a serial number of an image frame in which the object has exited are transmitted as exit information from the broadcasting server 100 to the play terminal 200 (step (a3); S140). The play terminal 200 receives and stores the exit information (step (b3); S240). The object, appearance information of which is received by the play terminal 200 in step (b1), is treated as existing in the virtual space regardless of whether the object moves or not, and image frames are created while the object is placed in the virtual space. When an object exits from the virtual space as a character dies or an item is destroyed, the time of exit is stored as exit information in the form of a serial number of an image frame. That is, an identification number of the object that has exited and a serial number of an image frame at a point of exit of the object are transmitted from the broadcasting server 100 to the play terminal 200 as exit information. When the exit information is stored, motion of the exiting object is not transmitted from the broadcasting server 100 to the play terminal 200 in step (a2) described above. In this way, a capacity of the data transmitted from the broadcasting server 100 to the play terminal 200 may be reduced.

While performing steps (b1), (b2), and (b3) described above, the play terminal 200 performs step (b4) (S260) at the same time to display the video received from the broadcasting server 100 on the screen. The play terminal 200 may create image frames in real-time by linking the appearance information, the motion state information, and the exit information with three-dimensional shape information corresponding to identification numbers of respective objects that are previously stored in the play terminal 200 to continuously create and display image frames on the screen (step (b4); S260).

In step (b4), the play terminal 200 displays a broadcast on the screen by rendering a broadcasting image on the screen in real-time by using the appearance information, the motion state information, and the exit information received by the play terminal 200 from the broadcasting server 100 and information about objects included in the library previously stored in the play terminal 200. It is assumed that the play terminal 200 includes a library of basic objects, but according to circumstances, the broadcasting server 100 may receive information about needed objects to create an image frame.

Data transmitted by the broadcasting server 100 to the play terminal 200 may include serial numbers of image frames with time and appearance information, motion state information, and exit information corresponding to serial numbers of the image frames. A serial number of a first image frame includes, as appearance information, serial numbers of all objects disposed in the virtual space, such as a basic background object of a broadcasting video. By using the appearance information, shape information of an object corresponding to an identification number of the object included in the appearance information is searched for in the library already stored in the play terminal 200 so as to dispose the object in the virtual space and create an image frame to be displayed on the screen in step (b4).

Then, the play terminal 200 sequentially renders next image frames on the screen. Motions of objects are realized based on the above-described motion state information to create next image frames. As the broadcasting time progresses (according to progression of serial numbers of image frames), when the play terminal 200 receives the appearance information in step (b1), a new object is disposed in the virtual space. When the play terminal 200 receives exit information in step (b3) according to progression of the broadcasting time, a corresponding object is removed from the virtual space.

In regard to motion state information of an object whose shape changes, as described above, the play terminal 200 continuously displays broadcasting images on the screen in step (b4) by creating a replay image frame in which the changing shape of the object is constructed according to a corresponding relation between a serial number of a frame of the motion and a serial number of an image frame.

By using the method of transmitting and receiving a broadcasting video by storing appearance information, motion state information, and exit information in units of image frames as described above, a broadcasting service may be provided based on a significantly small data capacity compared to the conventional method in which image frames are continuously transmitted and received using a streaming method. In addition, as a broadcast is displayed on the screen by using original information of a progression status of a broadcasting image, playing of the broadcast may be performed by adjusting an image quality of the video as desired according to circumstances. That is, a video may be displayed on the screen based on an appropriate image quality according to a calculation capability of the play terminal 200 and a resolution of a display device.

Meanwhile, according to the method of providing a broadcasting service and playing a broadcast by using an object state transmitting method of the present invention as described above, broadcasting images are realized by cumulatively displaying objects appearing in the virtual space based on progression of serial numbers of image frames with time. That is, it may be difficult to know entire information of objects to be displayed on a screen only based on appearance information, motion state information, and exit information corresponding to a serial number of an image frame at a particular point.

Thus, if the play terminal 200 receives a broadcasting image not from the start but from a predetermined middle point (or if a broadcasting image is viewed from a predetermined middle point), the broadcasting image is displayed on the screen as described below.

That is, changes in appearance information, motion state information, and exit information of the broadcasting image from a start point to a view starting point of the broadcasting image are calculated, and then information of all objects to be displayed in the virtual space at the view starting point is generated as new appearance information and transmitted to the play terminal 200. The play terminal 200 may receive the appearance information based on the view starting point to dispose objects to be displayed in the virtual space so as to create an image frame, and may generate subsequent image frames by using the same motion state information and exit information as described above.

According to circumstances, a period that the user may feel inconvenient may take when the play terminal 200 receives a broadcast from a predetermined view starting point by using the above-described method. That is, it may take a relatively long time for the broadcasting server 100 to calculate changes in objects from a first image frame to the view starting point.

In order to address this problem, the broadcasting server 100 may additionally transmit key frame information to the play terminal 200 as described below.

That is, in addition to steps (a1), (a2), and (a3) in which the broadcasting server 100 transmits broadcasting information to the play terminal 200 and steps (b1), (b2), and (b3) in which the play terminal 200 receives the broadcasting information, the broadcasting server 100 additionally transmits key frame information as described below to the play terminal 200.

Identification numbers of all objects displayed in the virtual space, numerical data of position coordinates and directions of the objects in the virtual space, and serial numbers of image frames are transmitted by the broadcasting server 100 to the play terminal 200 as key frame information at predetermined image frame intervals (step (a4); S150). Intervals between image frames, at which key frame information is stored, may be a predetermined time interval (for example, every one minute), or the broadcasting server 100 may store key frame information when there is a change in a situation of broadcasting content, when there is a change in a background, or at a point when a level changes. In a similar manner as appearance information, key frame information includes identification numbers of all objects existing in virtual space and information needed to create image frames by using the objects. For example, if an object is performing a motion, a serial number of the motion and a serial number of a frame corresponding to the motion at that moment are also stored as key frame information in addition to a serial number of an image frame corresponding to a key frame.

The play terminal 200 receives and stores the key frame information from the broadcasting server 100 (step (b5); S250) and uses the same to create an image frame of a broadcasting image in step (b4). When the play terminal 200 receives from the broadcasting server 100 a broadcast from the middle point thereof to play the broadcast, the play terminal 200 starts performing step (b4) by using most recently received key frame information to dispose information of all objects included in the key frame information in a similar manner as with respect to appearance information and by creating and displaying an image frame.

That is, instead of calculating changes in objects from a first image frame to a view starting point of a broadcasting image, the play terminal 200 calculates changes in the objects from a key frame just before the view starting point and then creates and renders an image frame on the screen. As information of most objects that are to be displayed on the screen are included in the key frame information, after disposing the objects in virtual space by using the key frame information, changes up to the view starting point are calculated by using motion state information, and then a replay image frame is created from the view starting point. By using the key frame information as described above, there is no need to calculate changes in every object from the first image frame to the view starting point even though the broadcasting image is viewed from a middle point of the broadcast.

The method of providing a broadcasting service and playing a broadcast by using an object state transmitting method according to the present embodiment is described above. Hereinafter, a method of providing a broadcasting service and playing a broadcast by adding audio information to the video described above will be described. Sound of broadcasting contents is transmitted by the broadcasting server 100 and received and played by the play terminal 200 by using a typical audio streaming method. According to circumstances, broadcasting may be performed by treating audio information also as an object as described below.

Audio information included in broadcasting content is also stored in the library of the broadcasting server 100 and the play terminal 200 as individual sound objects.

An identification number of a sound object appearing in a broadcasting image and a serial number of an image frame in which playing of the sound object starts are transmitted as sound appearance information by the broadcasting server 100 to the play terminal 200 (step (a5); S120). The broadcasting server 100 transmits the sound object to the play terminal 200 in a similar manner to the method of transmitting appearance information described above. The play terminal 200 receives the identification number of the sound object appearing in the broadcasting image and the serial number of the image frame in which playing of the sound object starts from the broadcasting server 100 as sound appearance information (step (b6); S220), and starts playing of the sound object at a point corresponding to a serial number of the sound appearance information in step (b4).

That is, in step (b4), while rendering the image frame of the broadcasting image, audio information of the sound object corresponding to the identification number of the sound object may be searched for in the library, and the sound object is played based on the sound appearance information corresponding to the serial number of the image frame.

The information of the sound object described above may also be included in the above-described key frame information. That is, when an identification number of a sound object played based on an image frame serial number corresponding to a key frame and a play duration of the sound object are stored, even when a video is played from the middle point of a script file, the video may be played by effectively synchronizing the sound object and a screen of the played video with each other.

While this invention has been particularly shown and described with reference to various embodiments thereof, the present invention should not be construed as being limited to the embodiments set forth herein.

For example, while a broadcast of a game play situation is described above as an example, the present invention may also be used in broadcasting animation or other various broadcasting contents.

What is claimed is:

1. A method of providing a broadcasting service by using an object state transmitting method, wherein a broadcasting server transmits image information to a play terminal so that the play terminal receives the image information in real-time and plays the image information, the method comprising:
    (a1) when things, characters, and backgrounds appearing in three-dimensionally defined virtual space, defined as objects, appear in virtual space of a broadcasting image, generating identification numbers of the objects, numerical data of position coordinates and directions of the objects in the virtual space, and serial numbers of image frames, in which the objects appeared, as appearance information and transmitting the appearance information to the play terminal so that the play terminal creates the objects disposed in the virtual space in units of image frames to render the image frames on a screen, wherein the generating and transmitting of the appearance information is performed by the broadcasting server;
    (a2) when an object that appeared in (a1) moves in the virtual space of the broadcasting image, creating numerical data defining a motion of the object corresponding to a serial number of the image frame as motion state information and transmitting the motion state information to the play terminal so that the play terminal creates the motion of the object in units of image frames and renders the image frames on the screen, wherein the creating and transmitting of the motion state information is performed by the broadcasting server; and
    (a3) when an object that appeared in (a1) exits from the virtual space, transmitting the identification number of the object and a serial number of an image frame in which the object exits, to the play terminal as exit information so that the play terminal removes the object from the virtual space and creates an image frame to render the image frame on the screen, wherein the transmitting of the exit information is performed by the broadcasting server.

2. The method of claim 1, further comprising (a4) transmitting identification numbers of all objects displayed on the virtual space, numerical data of position coordinates and directions of the objects in the virtual space, and serial numbers of image frames at predetermined image frame intervals, as key frame information, to the play terminal so that all objects existing in the virtual space are displayed on the screen to create image frames also when the play terminal receives a broadcast from a middle point of the broadcast from the broadcasting server and plays the broadcast, wherein the transmitting of the key frame information is performed by the broadcasting server.

3. The method of claim 1, wherein in (a2), when a shape of an object changes, a serial number of the shape of the shape-changing object and a serial number of an image frame are mapped to each other and transmitted as the motion state information to the play terminal so that the play terminal searches a library for the object and a change in the shape of the object to construct the shape in the virtual space of the broadcasting image to create an image frame.

4. The method of claim 1, further comprising (a5) transmitting, as sound appearance information, an identification number of a sound object appearing in the broadcasting image and a serial number of an image frame in which playing of the sound object starts, to the play terminal so that the play terminal searches for a sound object in a library stored in advance in the play terminal to start playing at a point corresponding to the serial number of the image frame, wherein the transmitting of the sound appearance information is performed by the broadcasting server.

5. A method of playing a broadcast by using an object state transmitting method, wherein a broadcasting server transmits image information to a play terminal so that the play terminal receives the image information in real-time and displays the image information on a screen, the method comprising:
    (b1) when things, characters, and backgrounds appearing in three-dimensionally defined virtual space, defined as objects, appear in virtual space of a broadcasting image, receiving, from the broadcasting server, identification numbers of the objects, numerical data of position coordinates and directions of the objects in the virtual space, and serial numbers of image frames, in which the objects appeared, as appearance information, wherein the receiving of the appearance information is performed by the play terminal;

(b2) when an object that appeared in (b1) moves in the virtual space of the broadcasting image, receiving, from the broadcasting server, numerical data defining a motion of the object corresponding to a serial number of the image frame, as motion state information, wherein the receiving is performed by the play terminal;

(b3) when an object that appeared in (b1) exits from the virtual space, receiving, from the broadcasting server, the identification number of the exiting object and a serial number of an image frame in which the object exits, as exit information, wherein the receiving is performed by the play terminal; and (b4) linking the appearance information, the motion state information, and the exit information respectively received in (b1), (b2), and (b3) with three-dimensional shape information corresponding to respective serial numbers of the objects stored in advance in the play terminal so as to create image frames in real-time and continuously display the image frames on the screen.

6. The method of claim 5, further comprising (b5) receiving from the broadcasting server and storing identification numbers of all objects displayed on the virtual space, numerical data of position coordinates and directions of the objects in the virtual space, and serial numbers of image frames at predetermined image frame intervals, as key frame information also when the play terminal receives a broadcast from a middle point of the broadcast from the broadcasting server and plays the broadcast, wherein the receiving and storing of the key frame information is performed by the play terminal, wherein in (b4), when the play terminal receives the key frame information, the play terminal create an image frame corresponding to the key frame information by using information of all objects included in the key frame information and displays the image frame on the screen.

7. The method of claim 5, wherein when a shape of the object is changed in (b2), a serial number of each shape of the shape-changing object and the serial number of the image frame are mapped to each other and transmitted by the broadcasting server as the motion state information to the play terminal, wherein in (b4), a library regarding the object and changes in the shape of the object is searched to construct the changing shape in the virtual space of the broadcasting image so as to create and display an image frame on the screen.

8. The method of claim 5, further comprising (b6) receiving, from the broadcasting server, an identification number of a sound object appearing in the broadcasting image and a serial number of an image frame, in which the playing of the sound object starts, as sound appearance information, wherein the receiving of the sound appearance information is performed by the play terminal, wherein in (b4), a sound object is searched for in a library stored in advance, by using a serial number of the sound appearance information received by the play terminal in (b6), and playing is started at a point corresponding to the serial number of the image frame.

* * * * *